May 23, 1967  E. ZALEJSKI  3,320,918

PARKING STRUCTURE FOR AUTOMOTIVE VEHICLES

Filed Oct. 24, 1965  5 Sheets-Sheet 1

INVENTOR
Edward Zalejski

BY *Polachek & Saulsbury*
ATTORNEYS

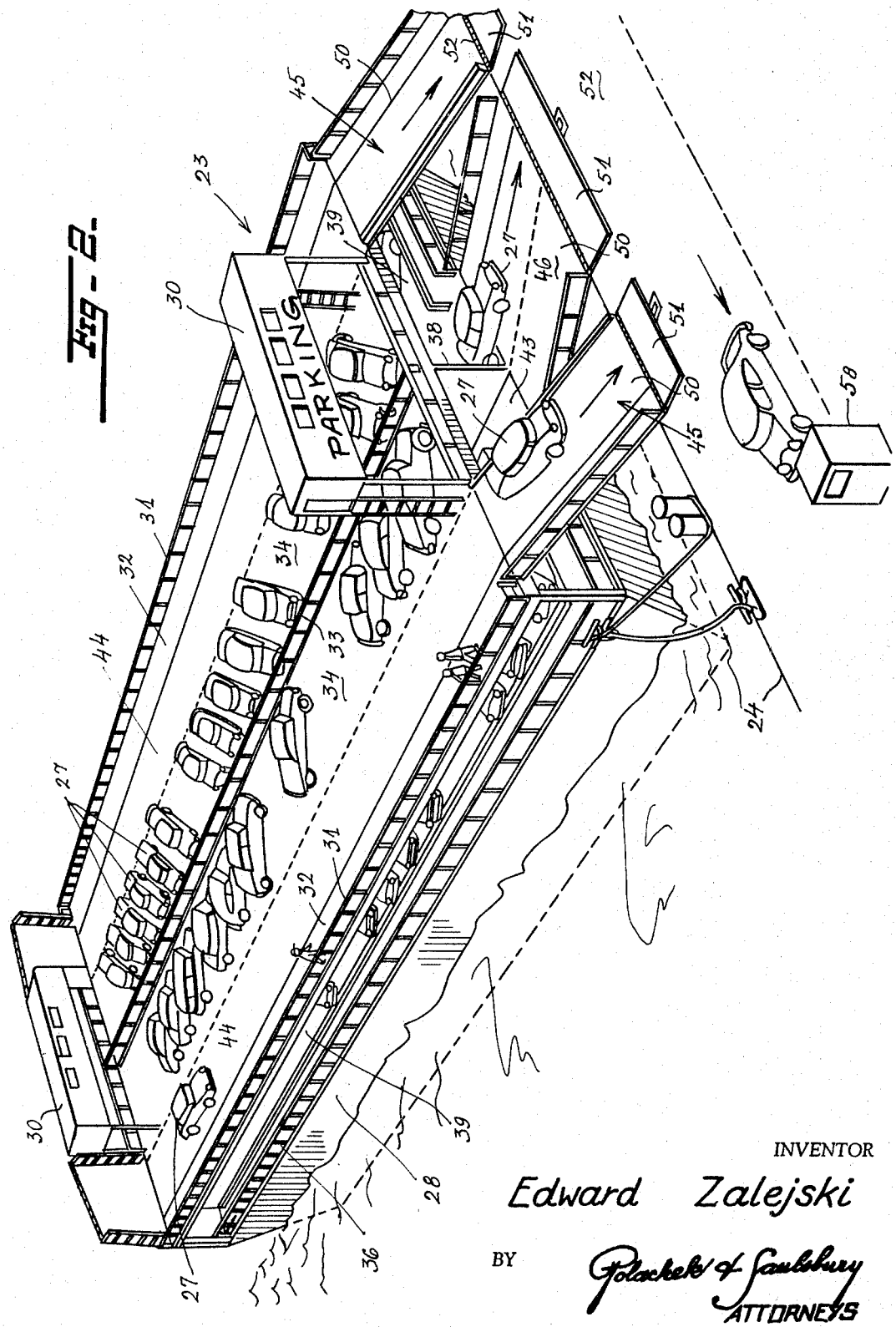

May 23, 1967
E. ZALEJSKI
3,320,918
PARKING STRUCTURE FOR AUTOMOTIVE VEHICLES
Filed Oct. 24, 1965
5 Sheets-Sheet 3
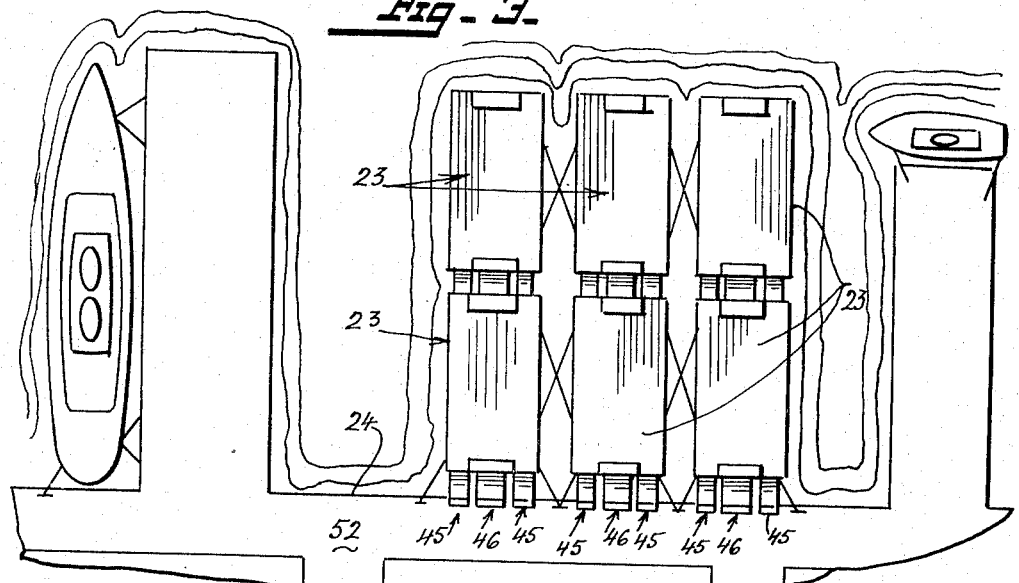
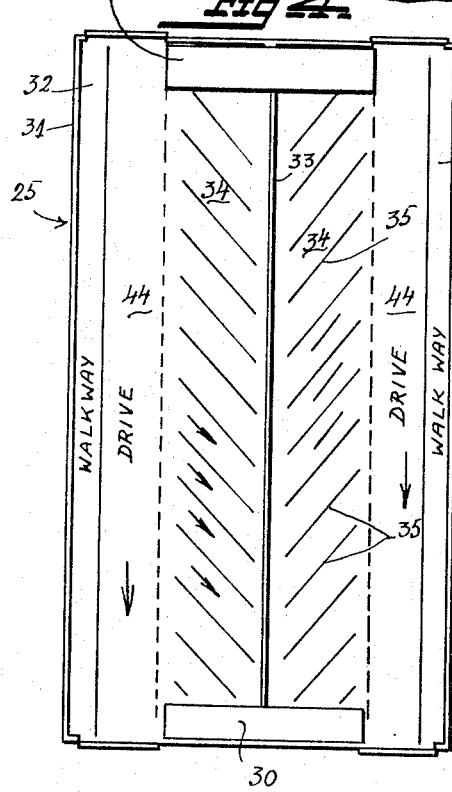
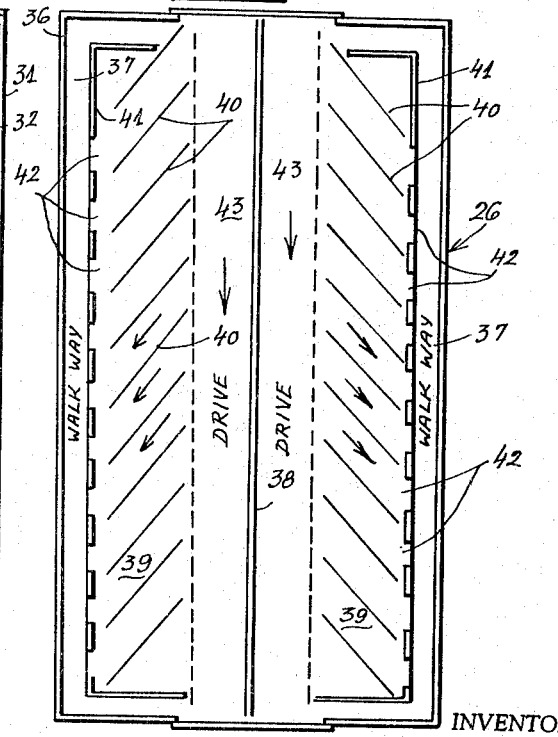
INVENTOR
Edward Zalejski
BY
Polachek & Saulsbury
ATTORNEYS

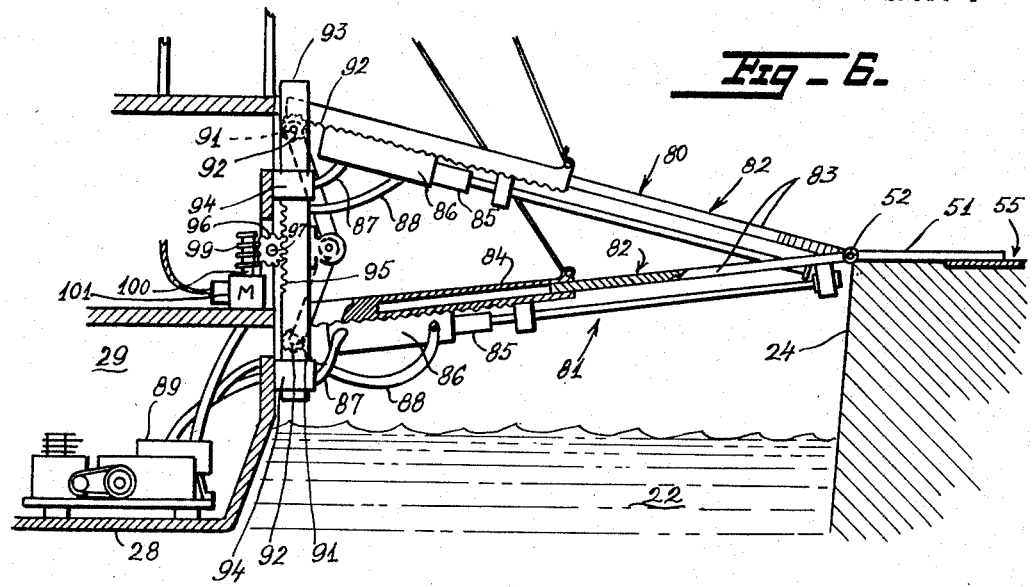
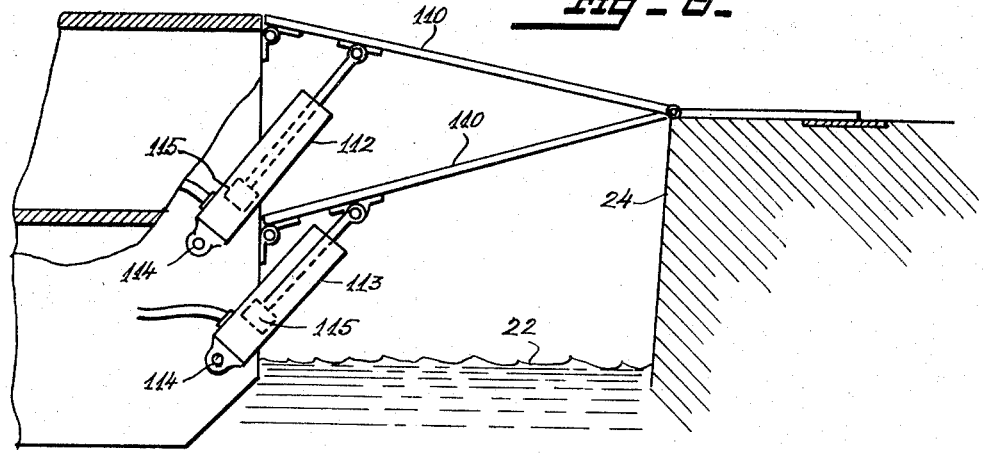
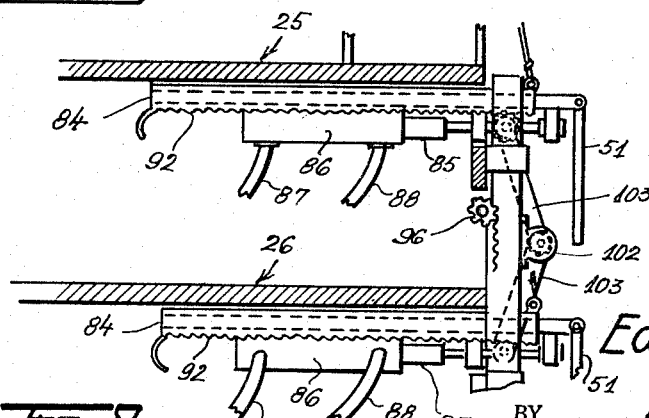

May 23, 1967  E. ZALEJSKI  3,320,918
PARKING STRUCTURE FOR AUTOMOTIVE VEHICLES
Filed Oct. 24, 1965  5 Sheets-Sheet 5
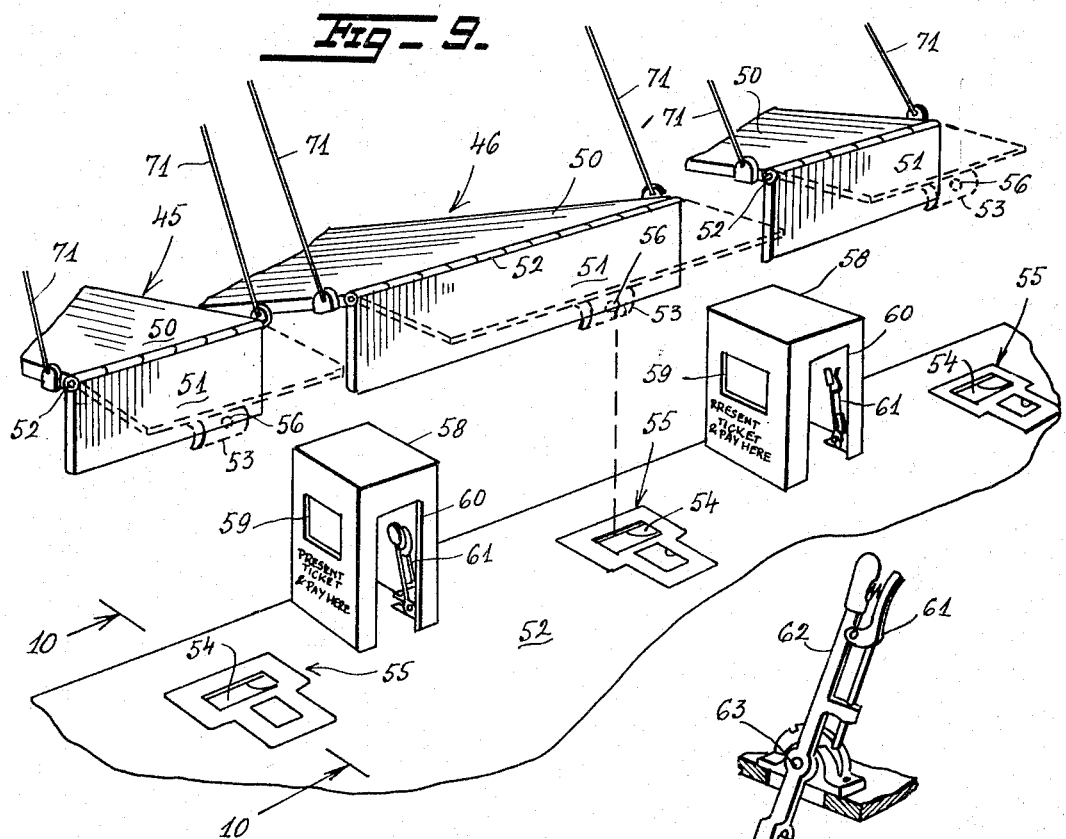
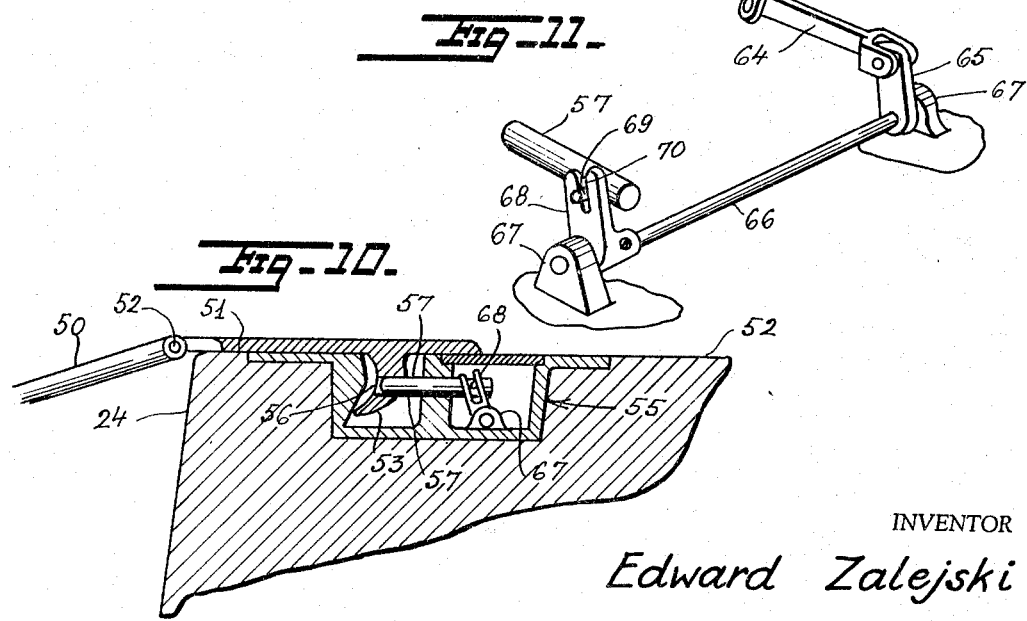
INVENTOR
Edward Zalejski
BY Polachek & Saulsbury
ATTORNEYS

United States Patent Office 3,320,918
Patented May 23, 1967

3,320,918
PARKING STRUCTURE FOR AUTOMOTIVE VEHICLES
Edward Zalejski, 92—23 54th Ave., Elmhurst, N.Y. 11373
Filed Oct. 24, 1965, Ser. No. 504,864
8 Claims. (Cl. 114—70)

This invention relates generally to parking structures for automotive vehicles. More specifically it relates to movable automobile parking structures.

It is generally well known that with the increased numbers of automobiles and trucks, the availability of parking space within any average city is becoming more scarce. In most cities automobiles are parked alongside the street curbs and it is not uncommon in congested areas for a motorist to cruise the streets for many blocks without the success of finding an available parking space. Many cities in an attempt to give every motorist an opportunity to park at least for awhile so to accomplish his business have installed parking meters along the curb whereby the vehicles are permitted to stay only a limited amount of time after which they must leave and thus provide space for another vehicle. Nevertheless, even this is insufficient in view of the enormous numbers of automobiles and thus parking lots and buildings accommodating only the parking of automobile vehicles have been provided. Nevertheless, in the downtown areas of the larger metropolises even this insufficient and such parking lots and parking buildings are often cram filled with cars. Thus, it is self-evident that the solution of automobile parking cannot be accomplished upon the land surface of the more congested larger cities. However, such traffic burdened cities if located along a waterfront of a river, lake or the sea are provided with natural space that may be used to advantage to alleviate parking problem.

Accordingly, it is a principal object of the present invention to provide an offshore automobile parking means whereby automotive vehicles may be parked offshore where there is ample space for accommodating the enormous numbers of vehicles.

Another object of the present invention is to provide an offshore automobile parking means which would provide the removal of the vehicle from the congested area thereby offering more space at curb sides for purposes of truck loading and unloading and thus eliminate the practice of double parking and the traffic jamming of vehicles in search of a parking space and who must otherwise continue to cruise and thus add to the heavy traffic flow.

Still another object of the present invention is to provide an offshore automobile parking means which will require a relatively small length of waterfront yet which will accommodate an almost endless amount of vehicles including means for transporting the vehicle away from the waterfront to a large parking area within the middle of the river or far out in the lake or bay.

Another object of the present invention is to provide an offshore automobile parking means which includes a floating dock which is moored some distance away from the shore's edge where there is more ample space and thus not take away shore space used for ship wharfs or the like.

A yet further object is to provide an offshore automobile parking means which includes a plurality of motorized barges having means to travel to the shore's edge and receive a large number of automobiles parked thereupon after which the barge may travel and tie up at the moored dock while another barge replaces the former at the shore's edge for accepting additional automobiles.

Other objects are to provide an offshore automobile parking system which requires a relatively few amount of barges, a relatively small amount of personnel to operate and which should increase the parking revenue of a municipality that operates the same.

These and other objects will be readily apparent upon a study of the following specification and accompanying drawings wherein:

FIG. 2 is a perspective view of one of the barges tied up along the shore edge.

FIG. 3 is a top plan view of a plurality of barges tied up in a group along the shore's edges.

FIG. 4 is a top plan view of the upper deck of one of the barges.

FIG. 5 is a plan view of the lower deck of one of the barges.

FIG. 6 is a cross-sectional view taken on the line 6—6 of FIG. 1 showing the gang plank in operative use.

FIG. 7 is a view similar to FIG. 6 showing the gangplank in retracted inoperative position.

FIG. 8 is a similar view of a modified form of gangplank mechanism.

FIG. 9 is a fragmentary perspective view of the barge gang planks and associated gang plank lock system ashore.

FIG. 10 is a cross-sectional view taken on the line 10—10 of FIG. 9.

FIG. 11 is a perspective view of the shore's gang plank lock mechanism shown per se.

Figure 1:
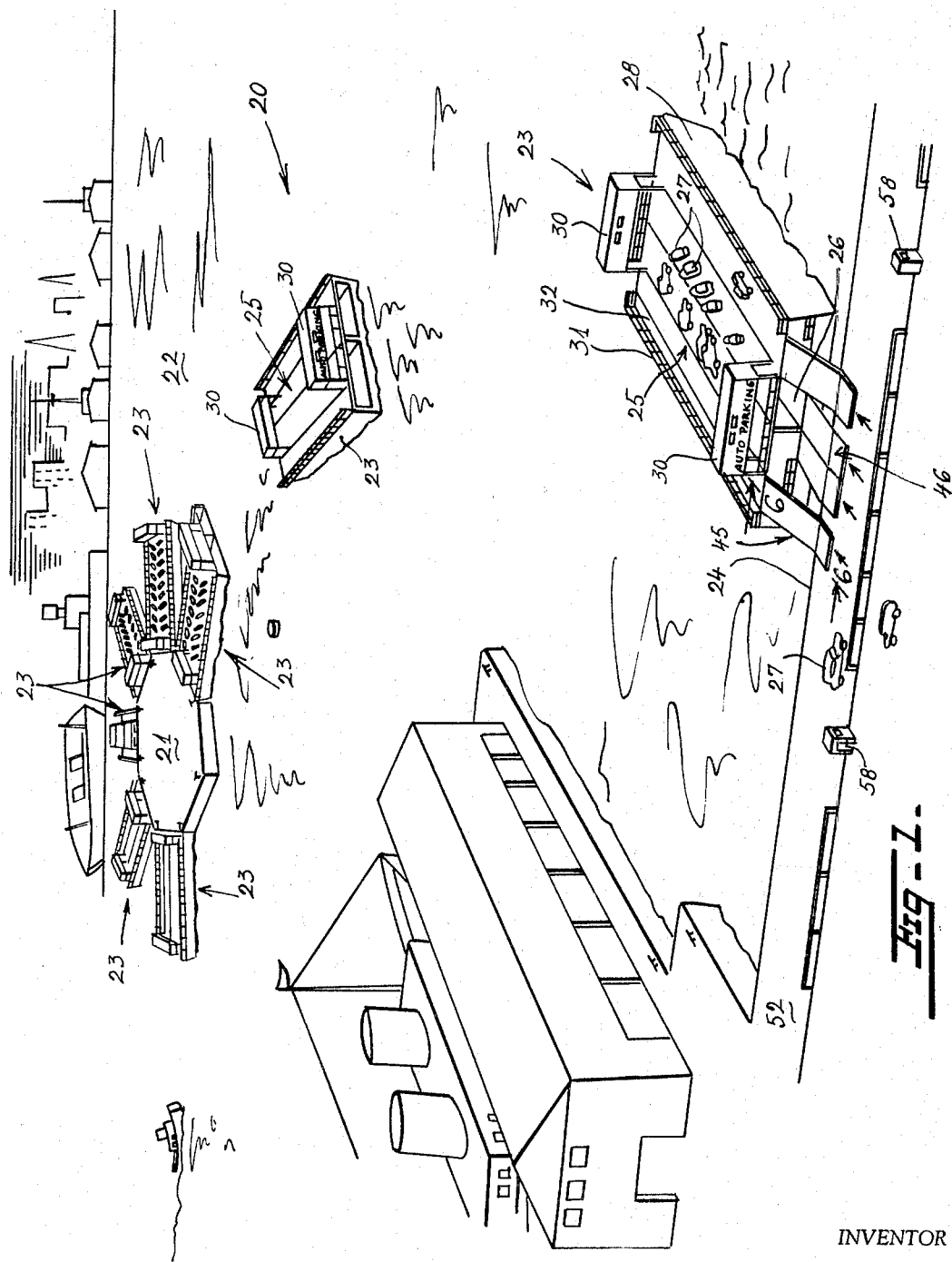
FIGURE 1 is a perspective view showing an offshore automobile parking system in operative use.

Referring now to the drawings in detail, the numeral 20 represents an offshore automobile parking system according to the present invention wherein there is a relatively large floating dock 21 moored or at anchor in the middle of a body of water 22 and wherein there are a plurality of motorized barges 23 which are movable between the dock and the shore edge 24. Each of the barges has a relatively large flat upper deck 25 and a lower deck 26 upon which automobiles 27 may be parked. Each barge includes a hull which is hollow to form an engine room 29 where mechanism may be contained for driving the boat through the water and mechanism for operating the gang planks, each barge additionally including a bridge or pilot's cabin 30 at each end of the barge from where the captain and officers may control the barge when travelling.

The upper deck 25 has a peripheral railing 31 to prevent the danger of walking motorists to fall overboard. A longitudinally extending walkway 32 is located adjacent each of the rails. A longitudinally extending rail 33 extends mid ships along the entire length of the upper deck and provides a dividing wall for vehicles upon each side thereof Adjacent each side of the railing 33 there is an automobile parking area 34 which is marked with painted lines 35 or the like made upon the deck and which indicate that the automobiles are parked at an angle as shown in FIG. 4 of the drawing.

The lower deck 26 has approximately the same layout as the upper deck and includes a peripheral railing 36, a walkway 37, adjacent thereto, for use by pedestrians and motorists on foot and it includes a central longitudinally extending wall 38 located amid ships to divide the automobiles on opposite sides of the barge. Parking means 39 are located adjacent the walkways and the parking areas have painted demarcation lines 40 upon the deck indicating the automobiles are to be parked at an angle. An upstanding wall 41 is located between the parking areas 39 and the walkways 37, the wall being provided with a plurality of doorways 42 along its entire length to allow motorists to walk along the walkways directly to their vehicle wherever parked. Upon the lower deck there is a longitudinal driveway 43 adjacent the central wall 38 whereas in the upper deck there is a driveway 34 located between each parking area 34 and the walkways 32. Thus the driveways of the upper and lower decks are not above each other. Thus gang planks for each of the driveways may be provided and each of the gang planks extending directly forward of each driveway toward the shore edge thus the upper deck driveways are provided with gang plank assemblies 45 near the sides and the lower deck driveways are provided with a common gang plank assembly 46 located at the center between the gang plank assemblies 45.

In the construction of the gang plank shown in FIGS. 1, 2 and 9, each gang plank assembly includes a runway 50 which extends between the barge driveways and the shore edge and it further includes an apron 51 connected by means of a hinge 52 to the lower end of the runway. The apron 21 in normal use rests upon the flat surface of the street or shore 52. The apron provides a smooth driving surface and a bump-free connection to the runway for the automotive vehicle.

Referring now to FIGS. 9, 10 and 11, a positive lock construction is shown whereby the barge is secured to the shore and wherein the apron is maintained level so that automobiles may enter thereupon and leave the same. Each apron is provided upon its underside with a hook 53 which is engageable within an opening 54 of a latch 55 embedded in the street 52, the upper end of the latch being flush with the street surface. Each hook 53 is provided having an opening 56 which is engageable by a sliding bolt 57 within the latch 55.

Upon the shore and adjacent the shore edge 24 there are a plurality of pay booths 58, each of which is fitted with a window 59 and a door 60. The booths are so positioned that the aprons 51 of the gang planks fit between and at the outer side of each booth whereby an attendant within the booth may present tickets or collect tolls from vehicles at the gang planks. Within each booth there are a set of controls 61 which can be manually operated by the attendant for securing the barge to the shore. The controls 61 activate the sliding bolts 57 which lock the gang plank to the shore. Each control 61 comprises a vertical lever 62 pivoted between its opposite ends on a fulcrum pin 63 and the lower end of the lever 62 is connected pivotally free to one end of the link 64. The opposite end of the link 64 is connected pivotally free to an arm 65 rigidly secured to a shaft 66 supported within bearings 67. A bifurcated arm 68 is rigidly affixed also to the shaft 66 and a pin 69 mounted within the sliding bolt 57 is freely slidable within the slot 70 between the bifurcated ends of the arm 68. Thus the attendant within the booth may readily disengage the sliding bolt from the apron thereby allowing the gang planks to be raised by means of cables 71 controlled by power winches upon the barge (not shown) and thus the barge may depart.

It will be readily obvious that the hinge 52 of the gang plank is designed to be located directly at the shore edge so that the vertical position of the barge will not affect the position of the apron. Thus, when there is a high tide or a low tide, the apron remains level at all times.

In a modified construction shown in FIGS. 1 and 2, the booths 58 may be located away from the gang planks and be positioned some distance away up the street as preferred.

In FIGS. 6 and 7, a modified type of gang planks is shown wherein the upper gang plank assembly 80 and the lower deck gang plank assembly 81 each includes a runway 82 comprised of a slidable section 83 which slides into a section 84; thus depending upon the elevation of the tide one runway may be made longer relative to the other as necessary. Each slidable section is provided with a piston 85 secured to the slidable section, the piston extending into a hydraulic cylinder 86. Oil lines 87 and 88 communicate between each end of the cylinder and a pump 89 within the engine room 29 of the barge. By operation of the pump 89 the pistons may be moved inwardly or outwardly within the cylinders thereby adjusting the extended position of the slidable section 83. As shown in FIGS. 6 and 7 of the drawing, it will be noted that the section 84 of the runway is supported at its one end upon a gear 90, the gear being in engagement with a toothed rack 92 on the underside of the section 84. Each gear 91 is mounted rotatably free upon a pin 92 mounted in a vertical frame 93. The vertical frame 93 is supported vertically slidable within bearings 94 secured to the hull of the barge. The vertical frame 93 has a toothed rack 95 engaged with a gear 96 mounted on a shaft 97 having a worm gear 98 (not shown) thereupon which is in engagement with a worm 99 on a motor shaft 100 of a motor 101.

Operation of the motor 101 provides means for vertical movement of the frame 93 between a position as shown in FIG. 6 where the runway is in alignment with each upper and lower deck and in inoperative position wherein each gang plank runway is lowered below the deck. A motor 102 mounted upon the frame 93 provides driving means through chain belts 103 to gears (not shown) mounted upon pins 92 thereby causing gears 91 to turn and thus cause the sections 84 in engagement with the gears 91 to be retracted beneath the underside of the upper and lower decks as shown in FIG. 7.

In FIG. 8, a modified construction is shown wherein gang planks 110 and 111 are raised by means of hydraulic cylinders 112 and 113 respectively.

In this construction the hydraulic cylinders are secured at the one ends on pins 114 attached to the hull of the barge and the pistons 115 are secured to the gang planks 110 and 111. Thus the gang planks may be individually raised as desired so to engage the shore regardless of the position of the tide.

While there are changes that may be made in the detailed construction, it is understood that such changes will be within the spirit and scope of the present invention as is defined in the appended claims.

What is claimed is:

1. In an offshore automobile parking system, the combination of a floating dock and a plurality of motorized barges, said floating dock having means for being moored away from shore in a body of water and said barges having means for movement between said dock and said shore, each of said barges having means for receiving and supporting a quantity of automobile vehicles for parking thereupon, each barge comprising a hull, a mechanism carried by said hull for propelling said barges between said dock and said shore, an upper deck and a lower deck, each of said decks providing a space for parking of automotive vehicles and access means between each of said decks and said shore, the upper deck of said barge comprising an elevated bridge over each end of said deck for housing controls for operation of engines within said hull, a peripheral railing around said deck, a longitudinal walkway adjacent each railing for pedestrians and motorists afoot, a longitudinally extending central railing across said deck providing a means for dividing cars on each side of said deck, a parking area adjacent each side of said central railing, and a longitudinal driveway between said parking area and said walkway on each side of said upper deck.

2. The combination as set forth in claim 1, wherein said lower deck comprises a peripheral railing around said lower deck, a peripheral walkway adjacent said railing, a longitudinally extending parking area adjacent each walkway, a wall between said walkway and said parking area, said wall having a plurality of doorways along its entire length to provide access for motorists between said walkway and said parking area, a longitudinally extending central wall extending midway along the entire length of said lower deck and a longitudinally extending driveway between said central wall and said parking areas.

3. The combination as set forth in claim 2, wherein said access means comprises a plurality of gang planks between said driveways of said upper and lower decks, said gang planks being affixed at the longitudinal ends of said barge and each of said gang planks including a runway and an apron, said apron being hingedly affixed to the end of said runway.

4. The combination as set forth in claim 3, wherein each said apron includes a hook formed on its underside, said hook being engageable within a latch secured within the street ashore, each of said latches having a sliding bolt which is receiveable within an opening in said hook of said apron for securement of said barge relative to said shore street.

5. The combination as set forth in claim 4, wherein each of said latches comprises a control lever pivoted between its opposite ends upon a fulcrum, one end of said lever forming a handle for manual operation of said lever and the other end of said lever being connected pivotally free to one end of a link, the opposite end of said link being connected pivotally free to one end of an arm securely affixed upon a shaft mounted rotatably free within bearings, a bifurcated arm mounted rigidly affixed to said shaft, a slot in said bifurcated arm for slidably receiving a pin secured in said sliding bolt and providing a means for sliding said bolt inwardly or outwardly of said opening in said apron hook.

6. The combination as set forth in claim 5, wherein each said gang plank runway comprises a pair of sections, one of said sections being slidable longitudinally within the other of said sections, said slidable section having a piston secured thereto, said piston being received within a hydraulic cylinder secured to said other section, hydraulic lines to each end of said hydraulic cylinder and to an oil pump providing means for delivering oil selectively to either side of said hydraulic cylinder for sliding said sliding section of said runway within said other section of said runway.

7. The combination as set forth in claim 6 wherein each said other section of said runway is provided with a toothed rack on its underside, said toothed rack being in engagement with a gear, said gear being rotatable upon a pin, supported within a vertically slidable frame, said vertically slidable frame being supported within bearings secured to said hull of said barge, said vertically slidable frame having a toothed rack engageable with a gear mounted on a shaft, a worm gear also mounted on said shaft, said worm gear being engaged with a worm mounted on a motor shaft of a motor, said motor providing a means for moving said vertical frame upwardly and downwardly.

8. The combination as set forth in claim 7, wherein each said gear engaged with said toothed rack of said other section of said gang plank runway is provided with drive means from a motor mounted on said vertically slidable frame, said motor having a sprocket on a motor shaft, said sprocket driving an endless chain, said endless chain driving a sprocket secured on said shaft of said gear engaged with said toothed rack of said other section of said gang plank runway.

References Cited by the Examiner
UNITED STATES PATENTS

| | | | |
|---|---|---|---|
| 2,341,866 | 2/1944 | Higgins | 114—60 |
| 2,715,969 | 8/1955 | Olsen | 114—72 |
| 3,076,205 | 2/1963 | Schultz | 9—8 |
| 3,120,106 | 2/1964 | Foster | 9—8 |

MILTON BUCHLER, *Primary Examiner.*

T. M. BLIX, *Assistant Examiner.*